(12) United States Patent
Kumbhari et al.

(10) Patent No.: US 9,032,063 B2
(45) Date of Patent: May 12, 2015

(54) DYNAMIC PORT NAMING IN A CHASSIS

(71) Applicant: International Business Machines Corporation, Armonk, NY (US)

(72) Inventors: Uday K. Kumbhari, Bangalore (IN); Rahul B. Rege, Ratnagiri (IN)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 14/040,852

(22) Filed: Sep. 30, 2013

(65) Prior Publication Data

US 2015/0095476 A1    Apr. 2, 2015

(51) Int. Cl.
*H04L 15/16* (2006.01)
*H04L 12/24* (2006.01)

(52) U.S. Cl.
CPC .................................... *H04L 41/00* (2013.01)

(58) Field of Classification Search
CPC ................................ H04L 45/02; H04L 41/12
See application file for complete search history.

(56) References Cited

U.S. PATENT DOCUMENTS

| | | | |
|---|---|---|---|
| 7,266,820 B2 | 9/2007 | Eddie et al. | |
| 8,028,193 B2* | 9/2011 | Dake et al. | 714/13 |
| 2010/0146000 A1* | 6/2010 | Greggs et al. | 707/792 |
| 2012/0110588 A1* | 5/2012 | Bieswanger et al. | 718/104 |

OTHER PUBLICATIONS

"Blade Center Type 8677 Planning & Installation Guide"—IBM, Sep. 2007 http://213.175.108.87/ibm/8677_planning_guide.pdf.*

Cisco, "Configuring Dynamic VLAN Membership", Chapter 8, Software Configuration Guide—Release 12.2(20)EW, 78-16453-01 A1, <http://www.cisco.com/en/US/docs/switches/lan/catalyst4500/12.2/20ew/configuration/guide/vmps.html>.

IBM, "Ethernet switch module configuration planning", BladeCenter S Types 7779 and 8886, <http://publib.boulder.ibm.com/infocenter/bladectr/documentation/index.jsp?topic=/com.ibm.bladecenter.8886.doc/dw1fs_c_esmodcp.html>.

IBM, "Method for dynamic discovery of blade chassis IP address and ports in a point to point connection", An IP.com Prior Art Database Technical Disclosure, Original Publication Date: Dec. 3, 2008, IP.com No. IPCOM000176999D, IP.com Electronic Publication: Dec. 3, 2008, <http://ip.com/IPCOM/000176999>.

Infoblox, "Switch Port Manager", © 2012 Infoblox Inc.,<http://www.infoblox.com/sites/infobloxcom/files/resources/infoblox-datasheet-switch-port-manager.pdf>.

Paradyne, Hotwire® 8540 and 8546 RADSL Cards, Network Configuration Gude, Document No. 8000-A2-GB21-50, Apr. 2000, Copyright © 2000 Paradyne Corporation, <http://www2.zhone.com/support/manuals/docs/80/8000-A2-GB21-50.pdf>.

Oracle, "Oracle Solaris Administration: SAN Configuration and Multipathing", Copyright © 2009, 2012, Oracle and/or its affiliates, <http://docs.oracle.com/cd/E23824_01/html/E23097/girho.html>.

* cited by examiner

*Primary Examiner* — Randy Scott
(74) *Attorney, Agent, or Firm* — Maeve L. McCarthy

(57) ABSTRACT

A tool for dynamically naming network ports and switch ports in a chassis. The tool retrieves, by one or more computer processors, chassis specifications of the chassis. The tool retrieves, by one or more computer processors, identifying information for components of the chassis. The tool determines, by one or more computer processors, a plurality of network ports and a plurality of switch ports within the chassis not assigned an alternative port name. The tool constructs, by one or more computer processors, alternative port names for the plurality of network ports and the plurality of switch ports within the chassis not assigned an alternative port name.

13 Claims, 5 Drawing Sheets

DYNAMIC PORT NAMING IN A CHASSIS

FIELD OF THE INVENTION

The present disclosure relates generally to the field of chassis based hardware, and more particularly to dynamic port naming of servers and switches in a chassis.

BACKGROUND OF THE INVENTION

In a next generation platform (NGP) chassis based hardware solution, ports existing on the network adaptors on each node are connected to internal ports on switches through a passive mid-plane, which hard-wires the connections. Hard-wiring depends heavily on the type of nodes, the type of network adaptors, and the type of switches used in the NGP chassis.

A chassis management module (CMM) present in the NGP chassis provides information on the components present within the chassis. IBM® Systems Director (ISD), an element management system, can also provide information on connectivity between the server ports and the switch ports within the chassis; however, providing information on connectivity requires certain protocols, such as Link Layer Discovery Protocols (LLDPs), to be enabled on the nodes and on the switches, and information to be gathered from LLDP neighbors. Connectivity may also be deduced from gathering information about MAC tables from switch modules, and checking for server port addresses within the MAC tables. Even though these two mechanisms are available for gathering information on connectivity, the topology information itself can be complicated, thus giving rise to confusion. Mid-plane provided connections vary depending on the type of nodes, network adaptors, and switches. Making the mid-plane connections (i.e., determining which port on which network adaptor is connected to which port on which switch), typically requires the topology information gathered from the ISD, or requires referencing documentation on the different types of nodes, network adaptors, and switches for information regarding element specific connectivity. Determination of these mid-plane connections becomes a relatively complex task.

SUMMARY

Aspects of an embodiment of the present invention disclose a method, system, and computer program product for dynamically naming network ports and switch ports in a chassis. The method includes retrieving, by one or more computer processors, chassis specifications of the chassis. The method includes retrieving, by one or more computer processors, identifying information for components of the chassis. The method includes determining, by one or more computer processors, a plurality of network ports and a plurality of switch ports within the chassis not assigned an alternative port name. The method includes constructing, by one or more computer processors, alternative port names for the plurality of network ports and the plurality of switch ports within the chassis not assigned an alternative port name.

DETAILED DESCRIPTION

Figure 1:
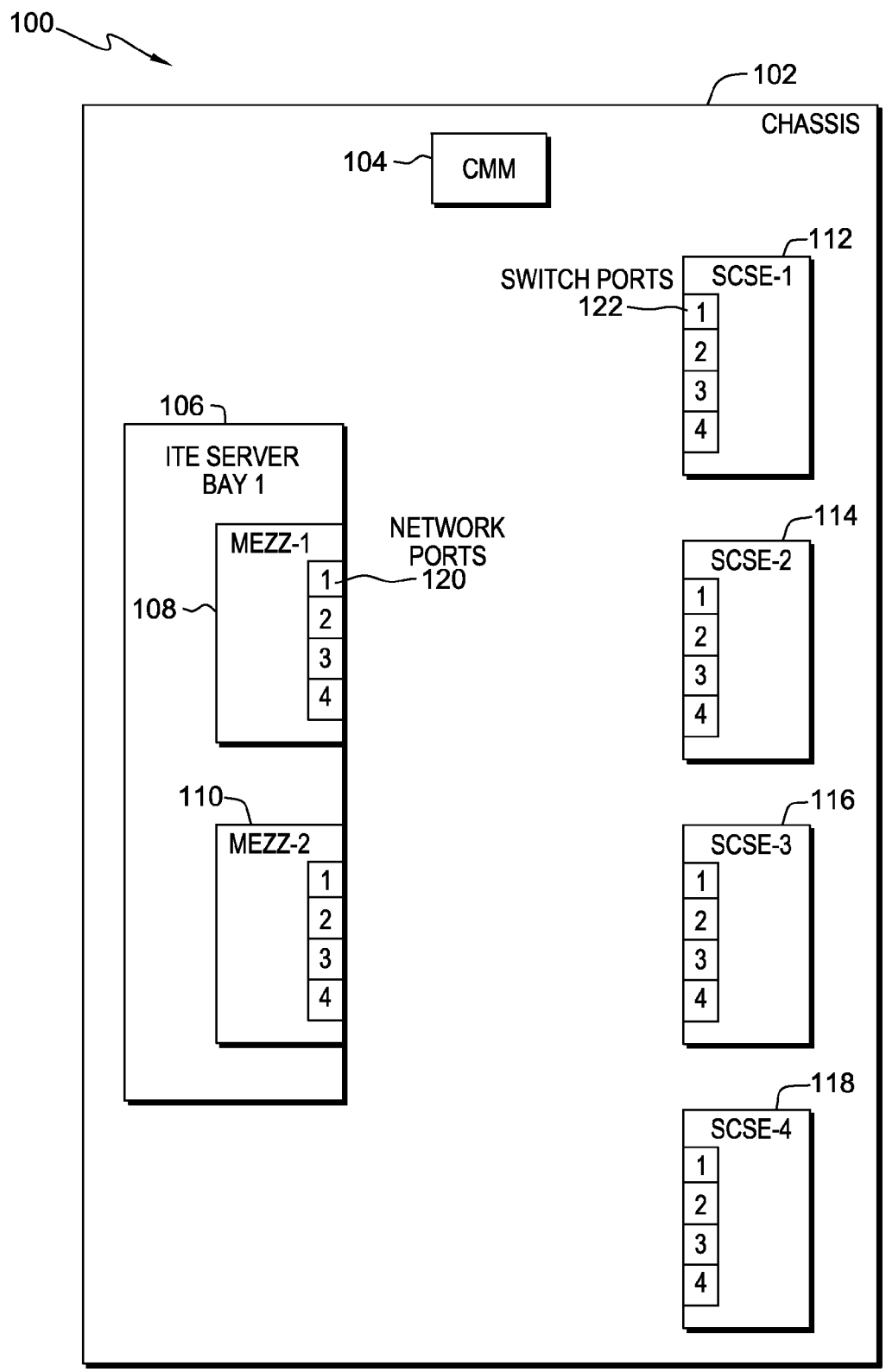
FIG. 1 is an exemplary block diagram, 100, illustrating a data processing system, in accordance with an embodiment of the present invention.

Embodiments of the present invention provide the capability to dynamically assign switch port names such that the name of each switch port gives clear and accurate information describing which network port on which network adaptor on which server (in what slot) to which the switch port is connected. Embodiments of the present invention also provide the capability to dynamically assign network port names, such that the name of each network port gives clear and accurate information describing which switch port on which switch (in what bay) to which the network port is connected.

Implementations of such embodiments may take a variety of forms, and exemplary implementation details are discussed subsequently with reference to Figures.

As will be appreciated by one skilled in the art, aspects of the present invention may be embodied as a method, system, or computer program product. Accordingly, aspects of the present invention may take the form of an entirely hardware embodiment, an entirely software embodiment (including firmware, resident software, micro-code, etc.), or an embodiment combining software and hardware aspects that may all be generally referred to herein as a "circuit," "module," or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by, or in connection with, an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by, or in connection with, an instruction execution system, apparatus or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions that execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The present invention will now be described in detail with reference to Figures. FIG. 1 illustrates an exemplary data processing environment, generally designated 100, including chassis 102. In an exemplary embodiment, chassis 102 is a flex system chassis based hardware solution, such as the NGP chassis, which integrates IBM System x (x86-based), IBM Power System (POWER 7 based), Enterprise Storage, networking, and management appliances in one single chassis.

In another embodiment, chassis 102 may take the form of other chassis based hardware solutions, such as a plurality of BladeCenter chassis solutions, Cisco® chassis based hardware solutions, and Hewlett Packard® chassis based hardware solutions. Chassis 102 includes a plurality of chassis components such as, chassis management module (CMM) 104, server (ITE) 106, and scalable switching elements (ScSE) 112, 114, 116, and 118. Chassis 102 has provisions for 14 half-wide ITEs (not shown) and 4 ScSEs. In another embodiment, chassis 102 may have provisions for a full wide ITE configuration, or a combination of full wide and half wide configuration.

CMM 104 is a management component present within a flex chassis. CMM 104 has access to the virtual product data (VPD) of the other components within the chassis (e.g. ITEs and ScSEs). In the exemplary embodiment, CMM 104 contains reference knowledge of mid-plane based connections, which is used to name server ports and switch ports within the chassis. In the exemplary embodiment, CMM 104 provides reference knowledge of mid-plane based connections (i.e., details of the fixed connectivity topology, between server ports and switch ports, provided by a passive mid-plane), as described in documentation (e.g., Red Books and hardware design specification set) for a plurality of chassis components. For example, CMM 104 may be programmed to statically store reference knowledge of mid-plane based connections. In another embodiment, CMM 104 may retrieve reference knowledge of mid-plane based connections from an external data base.

In the exemplary embodiment, CMM 104 identifies the location and type of an ITE, such as ITE 106, within a chassis, such as chassis 102. CMM 104 identifies the type and number of mezzanine cards, such as mezz card 108 and 110, present within an ITE, such as ITE 106, as well as the number of ports, such as network ports 120, present on each mezzanine card. CMM 104 identifies the location and type of a ScSE, such as ScSE 112, within a chassis, such as chassis 102. CMM 104 identifies the number of ports, such as switch ports 122, present on each ScSE.

In the exemplary embodiment, CMM 104 provides information on the connectivity between ITE 106 and ScSE 112, 114, 116, and 118. For example, CMM 104 may provide exact connectivity information between ITE 106 and ScSE 112 by dynamically retrieving a chassis specification (i.e., chassis type identifier and reference knowledge of mid-plane based connections) related to a present configuration of a chassis. Based on the retrieving the chassis specification, CMM 104 constructs alternative port names for server ports and switch ports within chassis 102 and assigns the alternative port names to the server ports and switch ports.

In another embodiment, CMM 104 may be an advanced management module (AMM) that resides within a plurality of BladeCenter chassis (e.g., BladeCenter H, BladeCenter S, etc.), and operates as a functional equivalent of the chassis management module.

In another embodiment, a separate management module, such as CMM 104, is not necessary to manage the chassis. For example, Cisco UCS Series Fabric Extenders may manage a Cisco chassis based solution, and may be capable of fetching the mid-plane connectivity information and assigning alternate port names to the switch ports and network ports within the chassis.

In the exemplary embodiment, ITE 106 is a server that resides within a NGP chassis. ITE 106 connects to scalable switching elements, such as ScSE 112, 114, 116, and 118, through a passive mid-plane that hardwires the connection.

ITE 106 contains one or more mezzanine cards, such as mezz card 108 and 110. Mezz card 108 and 110 contain a plurality of network ports 120. For example, mezz card 108 may provide for 2 network ports, 4 network ports, 6 network ports, and so on. In another embodiment, ITE 106 may be a blade that resides within a Bladecenter chassis (e.g., BladeCenter H, BladeCenter S, etc.)

In the exemplary embodiment, ScSE 112, 114, 116, and 118 are switches used specifically within a flex chassis, such as the NGP chassis. ScSE 112, 114, 116, and 118 contain one or more switch ports 122 that connect to server ports 120. ScSE 112, 114, 116, and 118 are scalable switching elements that are upgradeable via purchase of a license. For example, ScSE 112 may come with a base license, allowing switch port 1 and switch port 2 of switch ports 122 connectivity to ITE 106. With additional upgrade licenses switch port 3 and switch port 4 of switch ports 122 may be enabled, thereby increasing connectivity with ITE 106 (i.e., more network ports 120, such as network port 5, 6, 7, 8 (not shown) may be used to connect to switch port 3 and switch port 4 of switch ports 122). In another embodiment, ScSE 112, 114, 116, and 118 may be Ethernet switching modules (ESMs) that reside within a plurality of BladeCenter chassis (e.g., BladeCenter H, BladeCenter S, etc.), and operate as functional equivalents of ScSE 112, 114, 116, and 118.

Figure 2:
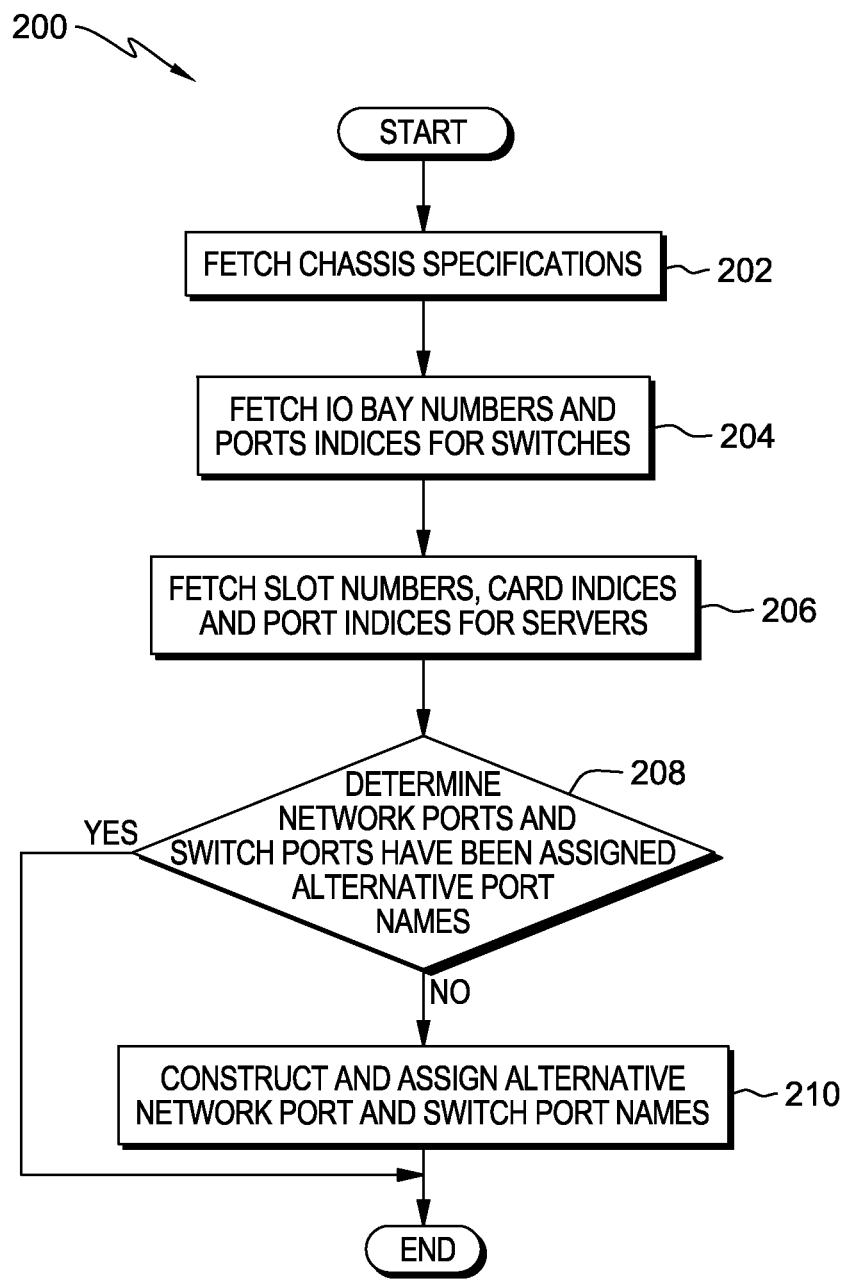
FIG. 2 is a flowchart, 200, depicting an exemplary process flow for dynamically naming network ports and switch ports, in accordance with an embodiment of the present invention.

FIG. 2 is a flowchart depicting the steps of CMM 104 for dynamically naming network ports and switch ports, in accordance with an embodiment of the present invention.

CMM 104 retrieves chassis specifications of a chassis, such as chassis 102 (step 202). In the exemplary embodiment, CMM 104 utilizes private connectivity to the chassis, and vital product data (VPD) packets and electrical wiring signaling exchanged between CMM 104 and devices within the chassis (i.e., ITEs and ScSEs), to retrieve chassis specifications including supported chassis type identifiers, reference knowledge of mid-plane based connections, and a list of ITEs and ScSEs within the chassis. Chassis type identifiers may be attributes that uniquely identify the chassis hardware (e.g., NGP chassis, BladeCenter H chassis, etc.). If CMM 104 retrieves chassis specifications identifying 14 half-wide ITEs and 4 ScSEs within the chassis, then it may be inferred from the chassis specifications that the chassis is a flex chassis, such as the NGP chassis, since the chassis specifications indicate attributes unique to a flex chassis. For example, a NGP chassis may be identified by a unique chassis type identifier, such as a CMM implementation.

In response to retrieving chassis specifications, CMM 104 retrieves, for each ScSE identified within the chassis, identifying information including an IO bay number denoting the location of the ScSE within the chassis, and port indices for all switch ports located within the ScSE (step 204). In the exemplary embodiment, CMM 104 retrieves the IO bay numbers and port indices through private connectivity to the chassis, vital product data (VPD) packets and electrical wiring signaling exchanged between CMM 104 and each ScSE, and the list of identified ITEs and ScSEs. CMM 104 identifies the number of ScSEs residing within the chassis, where a particular ScSE resides within the chassis, and the number and location of the switch ports present on the particular ScSE residing within the chassis. For example, CMM 104 may retrieve the identity of a switch port, defining the switch port as the third switch port of the ScSE located in IO bay 4 of the chassis.

In response to retrieving chassis specifications, CMM 104 retrieves, for each ITE identified within the chassis, identifying information including a slot number denoting the location of the ITE within the chassis, card indices for all network adaptor cards (i.e., mezzanine cards and LOMs) located within the ITE, and port indices for all the network ports located on the network adaptor cards (step 206). In the exemplary embodiment, CMM 104 retrieves the slot numbers, card indices, and port indices through private connectivity to the chassis, vital product data (VPD) packets and electrical wiring signaling exchanged between CMM 104 and each ITE, and the list of identified ITEs and ScSEs. CMM 104 identifies the number of ITEs residing within the chassis, where a particular ITE resides within the chassis, the number and location of the network adaptor cards present on the particular ITE, and the number and location of the network ports present on each network card present on the particular ITE. For example, CMM 104 may retrieve the identity of a network port, defining the network port as the third network port, located on the second network adaptor card of the server located in bay 1 of the chassis.

CMM 104 determines network ports and switch ports within the chassis have been assigned an alternative port name (decision block 208). In the exemplary embodiment, CMM 104 identifies, through topology and connectivity information gathered from retrieving chassis specifications, the number of network ports and the number of switch ports present within the chassis and, of those, identifies the number of network ports and the number of switch ports assigned an alternative port name. For example, CMM 104 may utilize vital product data (VPD) packets and electrical wiring signaling exchanged through direct connectivity between CMM 104 and other components of the chassis (e.g., ITEs, ScSEs, network ports, and switch ports, etc.) to determine network ports and switch ports within the chassis have been assigned an alternative port name. CMM 104 constructs alternative port names for network ports and switch ports not assigned an alternative port name until all network ports and switch ports within the chassis are assigned an alternative port name. For example, if CMM 104 determines that the number of network ports assigned an alternative port name is less than the total number of network ports within the chassis, CMM 104 constructs alternative port names for each network port name not already assigned an alternative port name (no branch of decision block 208) until the number of network ports assigned an alternative port name equals the total number of network ports within the chassis (i.e., every network port within the chassis has an alternative port name). Once CMM 104 determines that the number of network ports assigned an alternative port name equals the total number of network ports present within the chassis, CMM 104 ceases to construct alternative port names for network ports (yes branch of decision block 208).

Based on determining network ports and switch ports within the chassis have been assigned an alternative port name, CMM 104 constructs alternative port names for network ports and switch ports within the chassis (process block 210). The process of constructing alternative port names is discussed in further detail in FIG. 3. In the exemplary embodiment, CMM 104 provides for dynamically changing alternative port names based on the attributes mentioned above. For example, replacement of one ITE in a server bay with a different ITE in the server bay may change aspects of the connectivity within the chassis. Similarly, a change of network adaptors (e.g., Power mezzanine card to x86 mezzanine card) may impact the connectivity within the chassis (e.g., changes in mid-plane based connections). CMM 104 provides for dynamically changing alternative port names to reflect changes within the chassis that impact connectivity.

CMM 104 can amend the alternative port names to maintain clear and accurate information regarding connectivity between network ports and switch ports.

Figure 3:
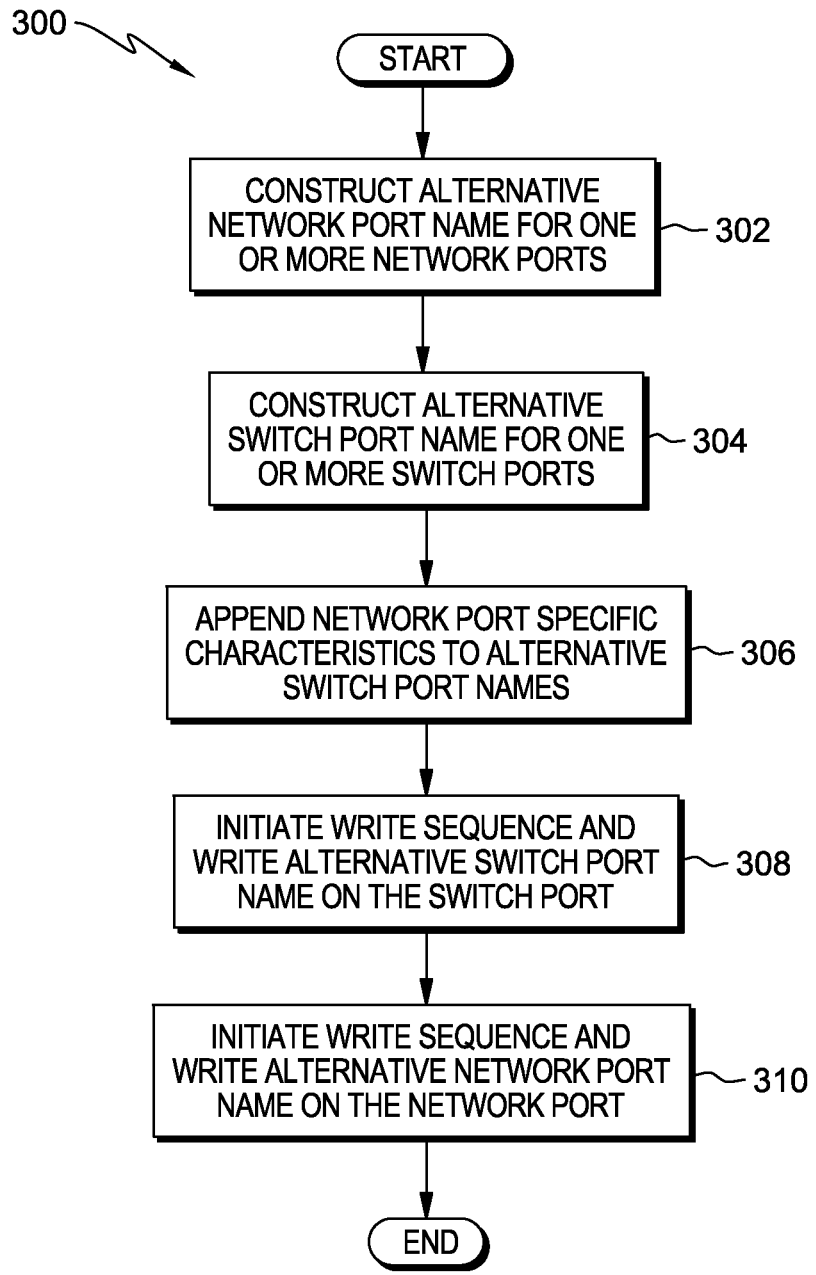
FIG. 3 is a flowchart, 300, depicting an exemplary process flow of block 210 in FIG. 2 for constructing alternative port names for network ports and switch ports, in accordance with an embodiment of the present invention.

FIG. 3 is a flowchart depicting the steps of process block 210 in FIG. 2 for constructing and assigning alternative port names for network ports and switch ports, in accordance with an embodiment of the present invention.

CMM 104 constructs an alternative network port name for one or more network ports present on the network adaptor card within the ITE (step 302). The alternative network port name represents which internal (server-facing) switch port on which ScSE the re-named network port connects to. In the exemplary embodiment, CMM 104 constructs the alternative network port name for a network port based on the chassis specification (e.g., unique chassis type identifiers, reference knowledge of mid-plane based connections, and types of chassis components, etc.), cardinality of the network ports (i.e., the numbered order of network ports) present on the one or more network adaptors within the chassis, the type of network adaptors (e.g., PowerMezz cards or x86 Mezz cards), the cardinality of the switch ports present on the one or more switches within the chassis, the type of switches (e.g., ScSEs), and the type of server (ITEs or Blades). A naming convention incorporating the aforementioned attributes is used to construct the alternative network port name. For example, the naming convention for alternative network port names may be [Switch X/Switch Port Y]. Therefore, a network port named [1/2] represents that the network port connects to the second ($2^{nd}$) port on the switch located in TO module bay 1.

CMM 104 constructs an alternative switch port name for one or more switch ports present within the chassis (step 304). The alternative switch port name represents which network port on which network adaptor on which ITE the re-named switch port connects to. In the exemplary embodiment, CMM 104 constructs the alternative switch port name for a switch port based on the chassis specification (e.g., unique chassis type identifiers, reference knowledge of mid-plane based connections, and types of chassis components, etc.), cardinality of the network ports (i.e., the numbered order of network ports) present on the one or more network adaptors within the chassis, the type of network adaptors (e.g., PowerMezz cards or x86 Mezz cards), the cardinality of the switch ports present on the one or more switches within the chassis, the type of switches (e.g., ScSEs), and the type of server (ITEs or Blades). A naming convention incorporating the aforementioned attributes is used to construct the alternative switch port name. For example, the naming convention for alternative switch port names may be [ITE Slot#/Adaptor#/Port# on the Adaptor] for the port Y of switch X. Therefore, a switch port Y of switch X named [1/2/3] represents that the switch port Y connects to the third ($3^{rd}$) network port on the second ($2^{nd}$) network adaptor on the server located in server bay 1.

CMM 104 appends network port specific characteristics to the alternative switch port name for one or more switch ports within the chassis (step 306). In the exemplary embodiment, CMM 104 appends network port specific characteristics such as port speed (e.g., 10 Gb, 40 Gb, etc.), port type (e.g., Infiniband, Ethernet, Fiber Channel, etc.), and virtualization attributes (e.g., vNIC/UFP) to the alternative switch port name. For example, the naming convention for alternative switch port names may be [ITE Slot#/Adaptor#/Port# on the Adaptor/Network Port Specific Characteristics] for the port Y of switch X. Therefore, a switch port Y of switch X named [1/2/3/100fe] represents that the switch port Y connects to the third ($3^{rd}$) network port on the second ($2^{nd}$) network adaptor on the server located in server bay 1, wherein the third ($3^{rd}$) network port is a 100 Gb Fiber Channel and Ethernet port.

CMM 104 initiates a write sequence and assigns the alternative switch port name to the switch port (step 308). In the exemplary embodiment, CMM 104 initiates a simple network management protocol (SNMP) write sequence and assigns the alternative switch port name. For example, CMM 104 may write the alternative switch port name as [ifDesc/ifAlias] on the switch port, such that the alternative switch port name will attach to the described switch port within the chassis. Subsequently, the switch port will identify itself using the alternative switch port name in lieu of previous designations.

CMM 104 initiates a write sequence and assigns the alternative network port name to the network port (step 310). In the exemplary embodiment, CMM 104 initiates a SNMP write sequence and assigns the alternative network port name. For example, CMM 104 may write the alternative network port name as [ifDesc/ifAlias] on the network port, such that the alternative network port name will attach to the described network port within the chassis. Subsequently, the network port will identify itself using the alternative network port name in lieu of previous designations. In another embodiment, CMM 104 may initiate a CMM command to write the alternative network port name on the network port.

Figure 4:
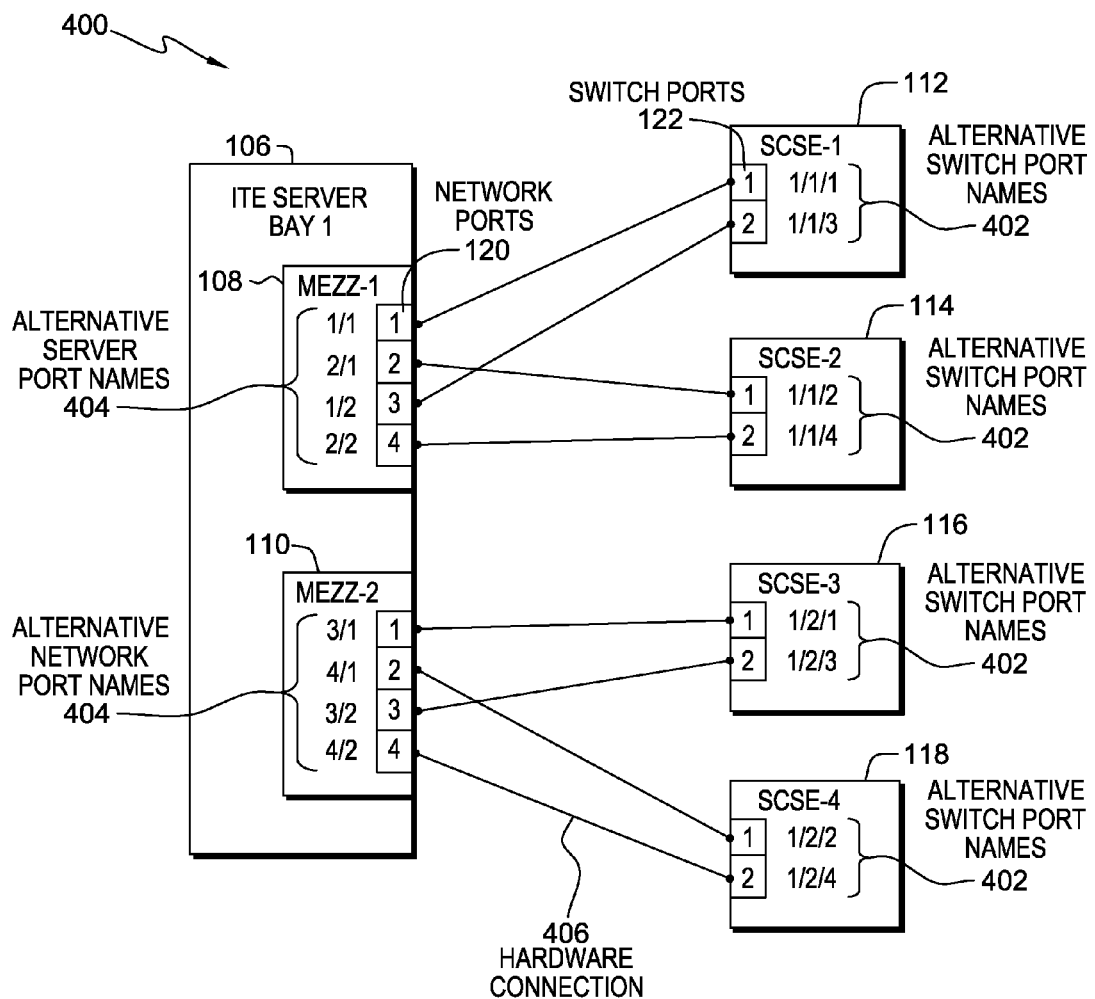
FIG. 4 is an exemplary configuration diagram, 400, of an embodiment of chassis 102 of FIG. 1, illustrating network ports and switch ports, having assigned alternative port names, hardwired in a mid-plane, in accordance with an embodiment of the present invention.

FIG. 4 depicts a configuration diagram, 400, of an embodiment of chassis 102 of FIG. 1, illustrating network ports and switch ports, having assigned alternative port names, hardwired in a mid-plane, in accordance with an embodiment of the present invention. In the exemplary embodiment, alternative switch port names 402 and alternative network port names 404 provide clear and accurate information regarding connectivity between network ports 120 and switch ports 122. Network ports 120 connect to switch ports 122 via hardwire connections 406 in the mid-plane (i.e., the physical space between ITEs and ScSEs). For example, network port 2 of network ports 120 on mezz-1 card 108 has the alternative network port name [2/1]. Alternative network port name [2/1] provides clear and accurate information regarding the connectivity of network port 2 of network ports 120 on mezz-1 card 108 within the chassis. Based on the naming convention [Switch X/Switch Port Y], alternative network port name [2/1] provides that network port 2 of network ports 120 on mezz-1 card 108 connects to switch port 1 of switch ports 122 on ScSE-2 114. Alternatively, switch port 1 of switch ports 122 on ScSE-2 114 has the alternative switch port name [1/1/2]. Alternative switch port name [1/1/2] provides clear and accurate information regarding the connectivity of switch port 1 of switch ports 122 on ScSE-2 114 within the chassis. Based on the naming convention [ITE Slot#/Adaptor#/Port# on the Adaptor], alternative switch port name [1/1/2] provides that switch port 1 of switch ports 122 on ScSE-2 114 connects to network port 2 of network ports 120 on mezz-1 card 108 on ITE 106 (located in the first bay of chassis 102). In the exemplary embodiment, alternative switch port names 402 can indicate characteristics of the port (e.g., speed, type, etc.). For example, switch port 1 of switch ports 122 on ScSE-4 118 has the alternative port name [1/2/4-40i]. Based on the naming convention [ITE Slot#/Adaptor#/Port# on the Adaptor/Network Port Specific Characteristics], alternative switch port name [1/2/4-40i] provides, in addition to information regarding connectivity within the chassis, that the switch port is a 40G Infiniband port.

Figure 5:
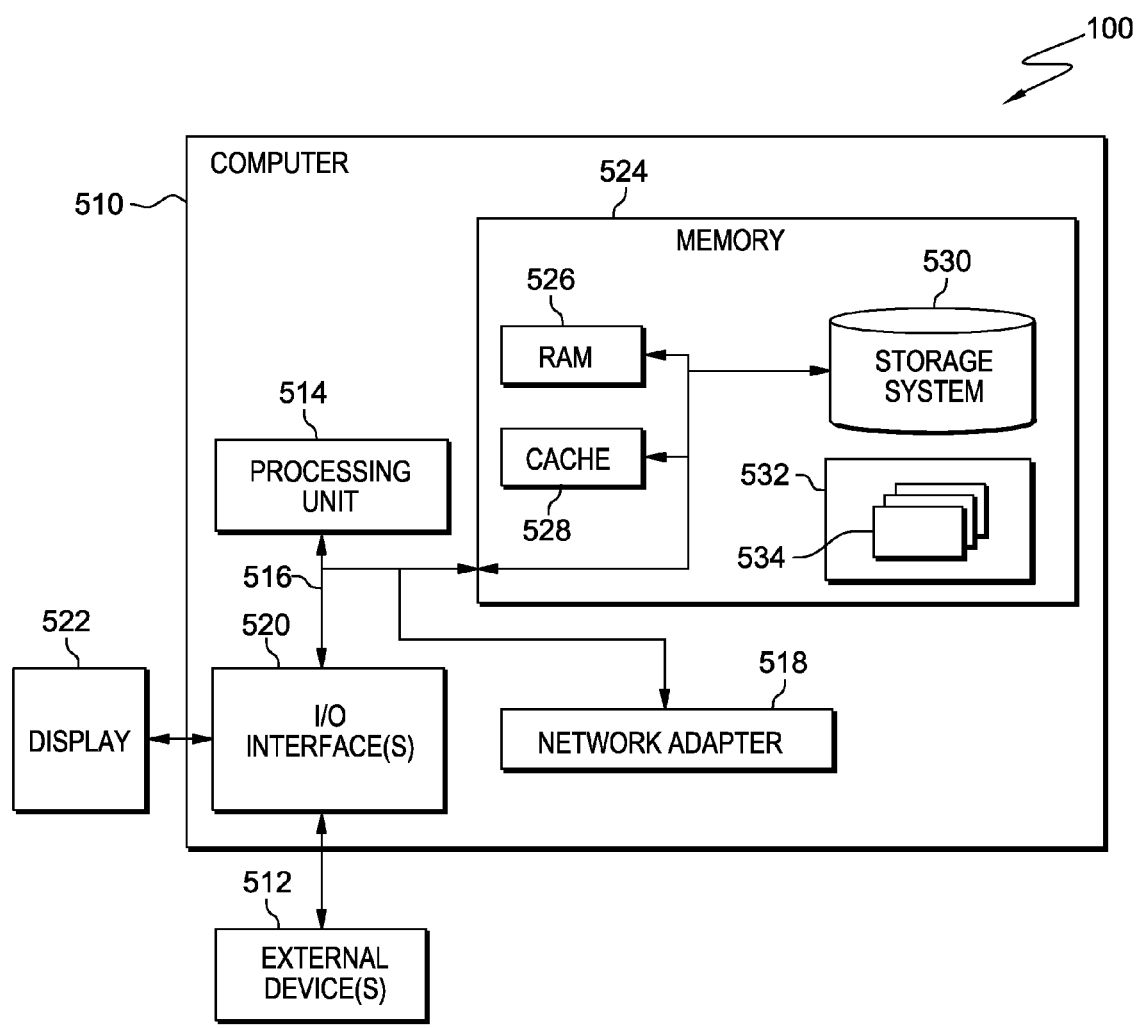
FIG. 5 is an exemplary block diagram, 500, of components of a data processing system, depicted in accordance with the present invention.

FIG. 5 is a block diagram depicting the components of data processing environment 100, in accordance with an illustrative embodiment of the present invention. It should be appreciated that FIG. 5 provides only an illustration of one implementation and does not imply any limitations with regard to the environments in that different embodiments may be implemented. Many modifications to the depicted environment may be made.

Computer system 510 in data processing environment 100 is shown in the form of a general-purpose computing device. The components of computer system 510 may include, but are not limited to, one or more computer processors or processing units 514, a system memory 524, and a bus 516 that couples various system components including system memory 524 to processor 514.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 510 typically includes a variety of computer system readable storage media. Such media may be any available media that is accessible by computer system 510, and it includes both volatile and non-volatile media, removable and non-removable media.

System memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 516 by one or more data media interfaces. As will be further depicted and described below, system memory 524 may include at least one computer program product having a set (e.g., at least one) of program modules that are configured to carry out the functions of embodiments of the invention.

Program/utility 532, having one or more sets of program modules 534, may be stored in memory 524 by way of example, and not limitation, as well as an operating system, one or more application programs, other program modules, computer management modules (e.g., CMM 104), and program data. Each of the operating systems, one or more application programs, other program modules, computer management modules, and program data, or some combination thereof, may include an implementation of a networking environment. Program modules 534 generally carry out the functions and/or methodologies of embodiments of the invention as described herein. Computer system 510 may also communicate with one or more external devices 512 such as a keyboard, a pointing device, a display 522, etc., one or more devices that enable a user to interact with computer system 510 and any devices (e.g., network card, modem, etc.) that enable computer system 510 to communicate with one or more other computing devices. Such communication can occur via Input/Output (I/O) interfaces 520. Still yet, computer system 510 can communicate with one or more networks such as a local area network (LAN), a general wide area network (WAN), and/or a public network (e.g., the Internet) via network adaptor 518. As depicted, network adaptor 518 communicates with the other components of computer system 510 via bus 516. It should be understood that although not shown, other hardware and software components, such as microcode, device drivers, redundant processing units, external disk drive arrays, RAID systems, tape drives, and data archival storage systems may be used in conjunction with computer system 510.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted in the Figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for dynamically naming network ports and switch ports in a chassis, the computer program product comprising:
   one or more computer-readable storage devices and program instructions stored on the one or more computer-readable storage devices, the program instructions comprising:
   program instructions to retrieve, by one or more computer processors, chassis specifications of the chassis;
   program instructions to retrieve, by one or more computer processors, identifying information for components of the chassis;
   program instructions to determine, by one or more processors, a plurality of network ports and a plurality of switch ports within the chassis not assigned an alternative port name; and
   program instructions to construct, by one or more computer processors, alternative port names for the plurality of network ports and the plurality of switch ports within the chassis not assigned an alternative port name.

2. The computer program product of claim 1, wherein the program instructions to retrieve, by one or more computer processors, chassis specifications of the chassis, further comprising one or more of:

program instructions to retrieve supported chassis type identifiers;
program instructions to retrieve reference knowledge of mid-plane based connections; and
program instructions to retrieve a list of servers and switches within the chassis.

3. The computer program product of claim 1, wherein the program instructions to retrieve, by one or more computer processors, identifying information for components of the chassis, further comprising one or more of:
program instructions to retrieve a slot number for one or more servers;
program instructions to retrieve card indices for one or more network cards;
program instructions to retrieve port indices for one or more network ports;
program instructions to retrieve a bay number for one or more switches; and
program instructions to retrieve port indices for one or more switch ports.

4. The computer program product of claim 1, wherein the program instructions determine, by one or more computer processors, a plurality of network ports and a plurality of switch ports within the chassis not assigned an alternative port name, further comprise:
program instructions to determine, by one or more computer processors, based, at least in part, on the retrieved chassis specification, a total number of network ports and switch ports;
program instructions to determine, by one or more computer processors, a number of network ports and switch ports do have assigned alternative port names; and
program instructions to subtract, by one or more computer processors, from the total number, the number of network ports and switch ports assigned alternative port names.

5. The computer program product of claim 1, further comprising, program instructions to assign, by one or more computer processors, the constructed alternative port names to the plurality of network ports and the plurality of switch ports within the chassis.

6. The computer program product of claim 1, wherein the program instructions to construct, by one or more computer processors, alternative port names for the plurality of network ports and the plurality of switch ports within the chassis not assigned an alternative port name, further comprise program instructions to construct, by one or more computer processors, alternative port names, such that the alternative port names represent to which respective ports on the chassis the plurality of network ports and the plurality of switch ports is connecting.

7. The computer program product of claim 6, wherein the program instructions to construct, by one or more computer processors, alternative port names, such that the alternative port names represent to which respective ports on the chassis the plurality of network ports and the plurality of switch ports is connecting, further comprise, program instructions to construct alternative port names using reference knowledge of mid-plane based connections and a naming convention based on identifying information including one or more of: a slot number, a bay number, a network port number, a network adaptor number, a switch port number, a server number, and a switch number.

8. A computer system for dynamically naming network ports and switch ports in a chassis, the system comprising:
one or more computer processors;
one or more computer-readable storage devices;
program instructions stored on at least one of the one or more computer-readable storage devices for execution by at least one of the one or more computer processors, the program instructions comprising:
program instructions to retrieve, by one or more computer processors, chassis specifications of the chassis;
program instructions to retrieve, by one or more computer processors, identifying information for components of the chassis;
program instructions to determine, by one or more processors, a plurality of network ports and a plurality of switch ports within the chassis not assigned an alternative port name; and
program instructions to construct, by one or more computer processors, alternative port names for the plurality of network ports and the plurality of switch ports within the chassis not assigned an alternative port name.

9. The system of claim 8, wherein the program instructions to retrieve, by one or more computer processors, chassis specifications of the chassis, further comprising one or more of:
program instructions to retrieve supported chassis type identifiers;
program instructions to retrieve reference knowledge of mid-plane based connections; and
program instructions to retrieve a list of servers and switches within the chassis.

10. The system of claim 8, wherein the program instructions to retrieve, by one or more computer processors, identifying information for components of the chassis, further comprising one or more of:
program instructions to retrieve a slot number for one or more servers;
program instructions to retrieve card indices for one or more network cards;
program instructions to retrieve port indices for one or more network ports;
program instructions to retrieve a bay number for one or more switches; and
program instructions to retrieve port indices for one or more switch ports.

11. The system of claim 8, wherein the program instructions determine, by one or more computer processors, a plurality of network ports and a plurality of switch ports within the chassis not assigned an alternative port name, further comprise:
program instructions to determine, by one or more computer processors, based, at least in part, on the retrieved chassis specification, a total number of network ports and switch ports;
program instructions to determine, by one or more computer processors, a number of network ports and switch ports do have assigned alternative port names; and
program instructions to subtract, by one or more computer processors, from the total number, the number of network ports and switch ports assigned alternative port names.

12. The system of claim 8, wherein the program instructions to construct, by one or more computer processors, alternative port names for the plurality of network ports and the plurality of switch ports within the chassis not assigned an alternative port name, further comprise program instructions to construct, by one or more computer processors, alternative port names, such that the alternative port names represent to which respective ports on the chassis the plurality of network ports and the plurality of switch ports is connecting.

13. The system of claim 12, wherein the program instructions to construct, by one or more computer processors, alternative port names, such that the alternative port names represent to which respective ports on the chassis the plurality of network ports and the plurality of switch ports is connecting, further comprise, program instructions to construct alternative port names using reference knowledge of mid-plane based connections and a naming convention based on identifying information including one or more of: a slot number, a bay number, a network port number, a network adaptor number, a switch port number, a server number, and a switch number.

* * * * *